Figure 1:
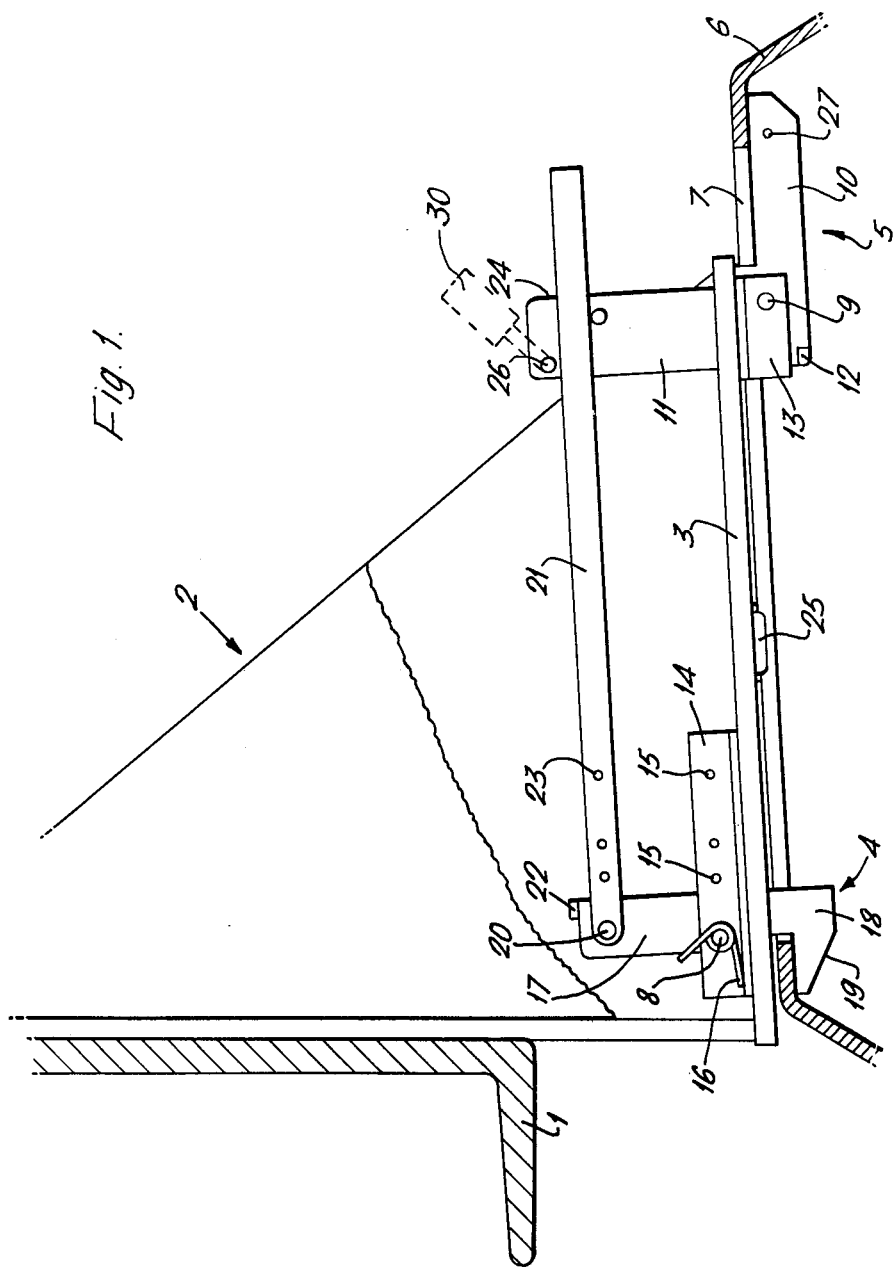

United States Patent [19]

Nilsson

[11] 4,245,762
[45] Jan. 20, 1981

[54] SPARE WHEEL CARRIER

[76] Inventor: Lars-Olof Nilsson, Transjö Toragård, S-342 00 Alvesta, Sweden

[21] Appl. No.: 938,448

[22] Filed: Aug. 31, 1978

[30] Foreign Application Priority Data

Sep. 8, 1977 [SE] Sweden .............................. 7710071

[51] Int. Cl.³ .......................................... B62D 43/00
[52] U.S. Cl. ................................ 224/42.24; 294/95
[58] Field of Search ............... 224/42.21, 42.24, 42.23, 224/42.19, 42.27, 42.12, 42.06; 294/95, 93, 86.24

[56] References Cited

U.S. PATENT DOCUMENTS

| | | | |
|---|---|---|---|
| 1,277,716 | 9/1918 | Grosvenor | 294/95 |
| 1,317,500 | 9/1919 | Holmquist | 294/93 |
| 1,365,946 | 1/1921 | Ovens | 224/42.27 |
| 1,451,262 | 4/1923 | Johnson et al. | 224/42.27 |
| 1,883,032 | 10/1932 | Smith | 224/42.24 |
| 2,931,549 | 4/1960 | Adkins | 224/42.24 |

*Primary Examiner*—Robert J. Spar
*Assistant Examiner*—Kenneth Noland
*Attorney, Agent, or Firm*—Albert L. Jeffers

[57] ABSTRACT

Spare wheel carrier having a bracket portion fastened to a chassis of a vehicle the bracket portion having at its lower side two hooks a first one of which being movable towards and from a second one, the second hook having a horizontally protruding leg for pivotally supporting the spare wheel at an edge surrounding a central opening through the wheel rim and for allowing the spare wheel to be pivoted to a substantially horizontal position in which the first hook engages an opposing portion of the edge. To lock the spare wheel securely against the bracket portion without use is being made of the wheel bolt holes of the rim the second hook has a portion movable to press the rim against the bracket portion or rubber elements provided on the lower side thereof. The two hooks are connected to a locking mechanism for locking the first hook in its position engaging the edge and the second hook in its position pressing the rim against the bracket portion.

6 Claims, 2 Drawing Figures

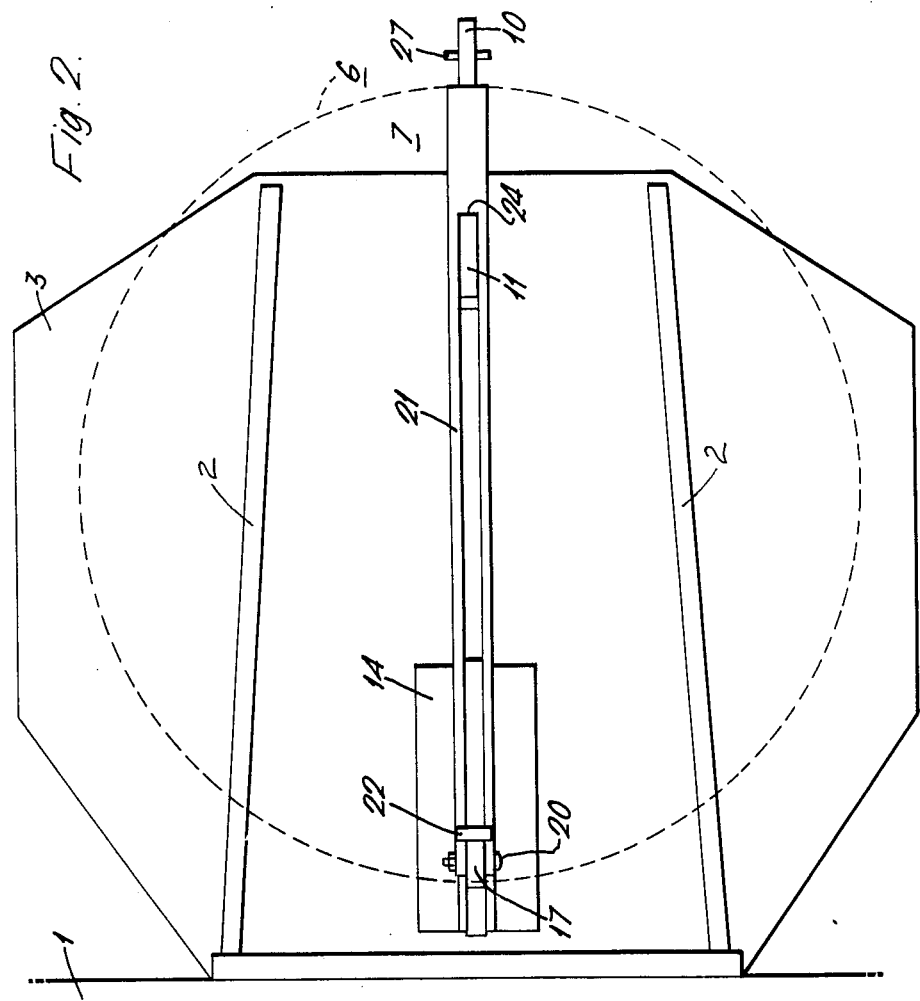

SPARE WHEEL CARRIER

This invention relates to a vehicle spare wheel carrier intended for carrying a spare wheel on a vheicle and comprising two hooks. A first one of these hooks being displacable towards and from a second one, said hooks being so positioned relatively each other that the edge of the center opening of the spare wheel can be brought to engagement with the second hook for enabling the spare wheel to pivot about said second hook so that an opposing portion of the edge of the center opening will engage the first hook.

In the Swedish patent 7102645-4 and in the British Pat. No. 891,171 there are shown two mutually very similar spare wheel carriers of the kind mentioned above. Thus, both patents show a carrier comprising a substantially horizontal plate carrying, on its edge remote from the longitudinal center line of the vehicle, a hook protruding horizontally from said edge. This hook is positioned at such a level above the ground, that if a spare wheel is rolled to a position in front of the hook, an upper edge portion of the central opening of the spare wheel can easily be brought to engagement with the hook. In this condition the spare wheel is hanging from the protruding stationary hook. Then the spare wheel is pivoted with its lower portion inwardly under the vehicle until the hook displacably provided on the lower side of the plate catches an opposing portion of the central opening. In this condition the spare wheel is hanging from the two hooks in a substantially horizontal attitude. According to the patents mentioned above there is provided extra fastening means comprising screws by means of which the spare wheel is pressed against the plate. In doing so use is made of the bolt holes in the wheel rim.

Though the spare wheel carriers described above have great advantages they also have serious drawbacks. Firstly, the use of screws extending through the bolt holes of the wheel rim makes it necessary to provide a special spare wheel carrier to each type or size of spare wheel. Secondly, the nuts used together with the screws are difficult to reach and have a troublesome tendency of rusting on to the screws even after a short period of time. This is due to the fact that the nuts are freely exposed to moisture, exhaust gases, road salt and so on.

Thus, the purpose of this invention is to provide a spare wheel carrier of the kind mentioned above, said carrier not being depending on the bolt holes of the wheel rim for fastening of the wheel and locking components having a tendency of getting rusted in.

According to the invention this is achieved if a spare wheel carrier, which comprises a bracket portion fastened to the chassis of the vehicle and carrying two hooks, a first one of which being movable towards and from a second one, said hooks being so positioned that the edge of the central opening of a spare wheel can be brought to engagement with the second hook for pivoting the spare wheel about this hook so that an opposing edge portion of the central opening will engage the first hook, is characterized in that at least the second hook comprises a movable portion for pressing the wheel against the bracket portion.

In a preferred embodiment of the inventive carrier the hooks are connected with a locking mechanism for locking the hooks in positions engaging said edge portions of the central opening and pressing the wheel against the bracket portion. By this means there is guaranteed a safe fastening of the wheel under all conditions even under heavy vibrations and the like.

In the practice the bracket portion comprises a substantially horisontal plate against which the wheel is pressed and the first hook is pivotable about a first shaft provided on the upper side of said plate and parallel thereto. According to the invention the second hook is pivotable about a second shaft parallel with the first shaft and comprises a leg extending from the upper side of the plate. Further the first hook comprises a leg extending above the first shaft said locking mechanism comprising a tie-rod for urging the upwardly extending legs of the hooks towards each other.

In a preferred embodiment the tie-rod is pivotably connected to the upwardly extending leg of the first hook and has a portion receiving the upwardly extending leg of the second hook, said upwardly extending leg of the second hook having on its side remote from the first hook a cam-surface for engaging the tie-bar said cam-surface being provided at a shorter distance from the pivotal axis of the tie-bar at its upper portion than is the case at its lower portion. By this configuration of the locking mechanism there is achieved by depressing the tie-rod towards the plate an adjustable pivoting motion of the second hook so that this hook no matter what thickness the edge portion of the wheel rim has the wheel can be pressed against the plate. Further, there is achieved a very great force for pressing the wheel against the plate.

The invention will be described in greater detail below and reference is being made to the accompanying drawings on which FIG. 1 schematically shows the spare wheel carrier seen in the lateral direction of the vehicle.

FIG. 2 shows the spare wheel carrier from above.

From FIG. 1 is apparent that the spare wheel carrier comprises a bracket portion 2, which by suitable means, for example by means of screws or by welding, is fastened to a beam of the vehicle chassis. The bracket 2 has at its lower end a substantially horizontal plate 3 which in a practical embodiment forms an angle of about 15° to the horizontal plane. On the lower side of the plate 3 there is provided an inner or a first hook 4 and an outer or second hook 5 the inner hook being pivotable about a pin 8 provided at the upper side of the plate while the outer hook 5 being pivotable about a pin 9 provided at the lower side of the plate. In FIG. 1 there is shown the way in which the two hooks are carrying a spare wheel 6 by extending through the central opening 7 and engaging the lower side of the edge defining the central opening 7 of the wheel rim 6.

As is mentioned above the outer or second hook 5 is pivotable about the pin 9 this pin being horizontal and provided in parallel with the plate. The hook 5 is L-shaped and is pivotable about the pin 9 within a limited swinging angle. The hook 5 has a substantially horizontal leg 10 the outer end portion of which engages the wheel rim 6. The horizontal leg 10 is connected to a substantially vertical leg 11 extending substantially perpendicularly through and above the plate 3. The pin 9 carrying the outer hook 5 extends through two brackets fastened one at each side of the hook, said brackets being fastened to the lower side of the plate in the vicinity of its edge remote from the centerline of the vehicle. The distance between the brackets 13 and the width of the slot in the plate 3 through which the leg 11 extends is of such a size that there is no risk that the hook can get rusted up. The swinging angle in clockwise direction is limited either by an abuttment 12 on the hook cooperating with one or both of the brackets 13, or by giving the slot through which the hook extends a suitable length towards the edge of the plate 3. The swinging angle of the hook 5 is selected in such a way that the hook, when pivoted as far as possible in the clockwise direction, has its lower leg 10 oriented to allow a wheel to be supported by the edge surrounding the opening 7 without any risk of sliding on the hook.

From FIG. 1 it is also evident that by means of the pin 8 the inner hook 4 is supported by elongated brackets 14 fastened to the upper side of the plate 3. The brackets 14 are provided with a series of holes 15 in which the pin 8 can be received so that the hook 4 can be positioned at different distances from the outer hook 5. Further, the inner hook 4 is provided with a spring 16, preferably designed as a so called hair pin spring and urging the hook 4 in the clockwise direction. As is shown in FIG. 1 the hook 4 has an upper portion 17 extending above the plate 3 and the brackets 14 as well. The hook 4 further has a lower portion shaped to engage with the wheel rim 6 and having on its side remote from the outer hook 5 an inclined surface 19 for pivoting the hook in the anti-clockwise direction when from below being hit by the wheel rim 6. By this means the wheel rim can easily be pivoted to the position shown on the drawing. At the upper end of the upper portion of the hook 4 there is at 20 linked a tension bar or tie-rod 21 which is pivotable in the anti-clockwise direction to engagment with an abuttment 22. When further pivoting the tension bar 21 in the anti-clockwise direction the hook 4 will be pivoted against the action of the spring 16 so that the wheel rim 6 becomes free.

The brackets 14 and the tension bar are provided with holes 15 and 23, respectively, said holes being equidistant and intended for alternate fastening of the hook 4 in the brackets and the tension bar 21 in the hook, respectively. By this means it is possible to move the hook 4 relatively the outer hook 5 so that the hooks can be adapted to engage wheel rims 6 having different sizes of their openings 7.

The outer end of the tie-rod 21 is as is best shown in FIG. 2 shaped as a fork receiving the upper end portion of the leg 11. Further, this leg 11 has on its side remote from the inner hook 4 a cam surface 24 shaped in such a way that it has a shorter distance to the linkage point 20 at its upper end than is the case at its lower end. Due to this depressing the outer end of the tension bar 21 along the leg 11 will cause a pressing together of the two upwardly extending portions of the two hooks. This implies that the lower portion 18 of the inner hook is moved away from the outer hook 5, i.e. to an even more secure engagement with the wheel rim 6, while the horizontal leg 10 of the outer hook 5 is moved upwardly so that the trim 6 is pressed against the lower side of the plate 3. To further ensure that the rim is not rattling or displaced there is at the bottom side of the plate 3 provided rubber elements 25 engaging the rim. These rubber elements are securing the rim in correct position by means of increased friction. The depressing of the outer end of the tension bar 21 can preferably be facilitated by having the outer end of the tension bar shaped for cooperation with an extension bar by means of which a very great depression force can be exercised causing an increased pivoting force to the hooks. In order to prevent relative movement between the tension bar 21 and the leg 11 this is provided with a series of holes 26 through a selected one of which is introducable a locking element, for instance a padlock 30, a snap-hook or the like. When such a locking element is used above the tension bar all motion directed upwardly is prevented.

The inventive device operates in the following way: When a spare wheel 6 is to be mounted on the spare wheel carrier the wheel is rolled to a position in front of the outer hook 5. In this position the upper edge portion of the central opening 7 of the wheel can be situated at a level somewhat below the leg 10 of the outer hook 5. In order to facilitate lifting the wheel 6, which can have a weight amounting to 100 or 200 kg, to a position where the wheel is hanging from the leg 10 use can be made of a lifting bar being brought to engagment with fastening means 27 on the leg 10. In doing this the lifting bar is introduced through the central opening 7 of the wheel and is fastened to the leg 10 whereupon the free end of the lifting bar is lifted so that the wheel will slide along the lifting bar onto the leg 10. Then the lifting bar is removed from the leg 10. The spare wheel is now hanging from the leg 10 in such a way that it does not touch the ground. In this condition the spare wheel can easily be pivoted with its lower portion inwardly below the spare wheel carrier so that the opposing portion of the edge surrounding the central opening of the wheel will contact the inclined surface 19 to pivot the inner hook 4 in anti-clockwise direction. When the rim 6 is abutting the plate 3 or just before this occurs the inner hook is pivoted back by the spring 16 to trap the rim 6 in the position shown in FIG. 1. To securely lock the spare wheel the tension bar 21 is first drawn by hand out from the carrier and is then pressed down to receive the leg 11 of the hook 5. Then the lifting bar, the one end of which is suitably shaped, is attached to the free end of the tension bar and the outer end of the tension bar is pressed down along the cam surface 24. In doing so the inner hook is pivoted in clockwise direction while the outer hook 5 is pivoted in the opposite direction and the wheel securely is pressed against the plate 3 and the rubber elements 25. When a proper pressing force has been achieved the lifting bar is removed from the tension bar 21 and a locking element, e.g. a pad-lock or a snap-hook, is fastened in a selected one of the holes 26 above the tension bar 21.

When the spare wheel is to be removed from the spare wheel carrier the locking element is first removed from the hole 26 whereupon the free end of the tension bar 21 is lifted, possibly by means of the lifting bar so that the tension bar is free of the leg 11 of the outer hook. Lifting the tension bar is carried on until it contacts the abuttment 22 and the motion thereof is transmitted to the inner hook which in turn is pivoted in anti-clockwise direction so that the engagement between the inner hook 4 and the rim 6 no longer is present. When this happens the wheel will pivot downwardly so that it will be hanging from the leg 10 in a substantially vertical attitude. Finally the wheel is slided along the leg 10 until it falls down a short distance to the ground. Then the wheel can easily be rolled to the placed where it is to be used.

I claim:

1. In a spare wheel carrier for a vehicle and including a frame, means for fastening said frame to said vehicle, first and second hook members respectively pivotally mounted on said frame in spaced relation, said hook members respectively having oppositely extending hook portions depending from said frame and adapted to engage diametrically opposite points on the edge of the center opening of a spare wheel rim: the improvement wherein said hook members respectively have ends opposite said hook portions and are pivoted intermediate said ends and said hook portions, each of said hook members being pivotally movable independently of the other hook member from a first disengaged position to a second position adapted to engage said rim and to press the same against said frame; and further comprising spring means for biasing said first hook member toward said second position thereof; and an elongated tension bar having opposite ends, one end of said opposite ends of said tension bar being pivotally connected to said end of said first hook member, the other end of said opposite ends of said tension bar being selectively pivotally movable from a first disengaged position to a second position in engagement with said end of said second hook member, said other end of said tension bar and said second hook member end having means for pulling said end of said second hook member toward said end of said first hook member in response to said engagement thereby pivotally to move said second hook member toward said second position thereof.

2. The spare wheel carrier of claim 1 wherein said pulling means comprises means on said other end of said tension bar for receiving said end of said second hook member, and a cam surface on said end of said second hook member cooperating with ssaid receiving means to move said second hook member end toward said first hook member end.

3. The spare wheel carrier of claim 2 wherein said other end of said tension bar includes means for locking the same to said end of said second hook member.

4. The spare wheel carrier of claim 2 wherein said other end of said tension bar is adapted to receive an extension bar.

5. The spare wheel carrier of claim 2 wherein said hook portion of said second hook member is adapted to suspend said spare wheel from said rim thereof in said first position of said second hook member.

6. The spare wheel carrier of claim 5 wherein said hook portion of said first hook member has an inclined surface adapted to be engaged by said spare wheel rim edge thereby to pivot said first hook member to said first position to permit said rim to be pivoted about said hook portion of said second hook member to a storage position engaged by both hook portions.

* * * * *